United States Patent [19]

Kawada et al.

[11] Patent Number: 5,163,546
[45] Date of Patent: Nov. 17, 1992

[54] AC MAGNETIC FLOATING CONVEYOR AND OPERATION METHOD THEREOF

[75] Inventors: Noriyuki Kawada; Shigeki Morii; Motomi Nakashima; Jin Yamada; Akitami Kaneko, all of Hiroshima, Japan

[73] Assignee: Mitsubishi Jukogyo Kabushiki Kaisha, Tokyo, Japan

[21] Appl. No.: 749,306

[22] Filed: Aug. 23, 1991

[30] Foreign Application Priority Data

Oct. 12, 1990 [JP] Japan .................. 2-272364

[51] Int. Cl.⁵ .............................. B65G 35/00
[52] U.S. Cl. .................... 198/619; 104/282
[58] Field of Search ............ 104/282, 283; 198/619

[56] References Cited

U.S. PATENT DOCUMENTS

| | | | |
|---|---|---|---|
| 3,858,522 | 1/1975 | Maki | 104/282 |
| 3,867,886 | 2/1975 | Maki | 104/282 |
| 4,013,906 | 3/1977 | Eastham | 104/282 X |
| 4,055,123 | 10/1977 | Heidelberg | 104/282 X |

FOREIGN PATENT DOCUMENTS

| | | | |
|---|---|---|---|
| 0130926 | 6/1987 | Japan | 198/619 |
| 0299121 | 12/1989 | Japan | 198/619 |

OTHER PUBLICATIONS

Patent Abstracts Of Japan, unexamined applications, M field, vol. 10, No. 333, Nov. 12, 1986, Kokai-No. 61-136 819 (Shinko Electric Co. Ltd).

Patent Abstract of Japan, unexamined applications, M field, vol. 11, No. 278, Sep. 9, 1987, Kokai-No. 62-79 122 (Toshiba Corp).

Patent Abstracts Of Japan, unexamined applications, M field, vol. 11, No. 278, Jan. 22, 1981, Kokai-No. 55-140 424 (Ishikawa Jima Harima Yukogyō K K).

Primary Examiner—D. Glenn Dayoan
Attorney, Agent, or Firm—McAulay Fisher Nissen Goldberg & Kiel

[57] ABSTRACT

An AC magnetic floating apparatus for floating and conveying a conductive floating body of paramagnetic or nonmagnetic metallic material above a line of AC electromagnets, includes a single-phase AC current source having a first frequency for floating the floating body, a three-phase AC current source having a second frequency for conveying the floating body, an adder for adding AC current from the two current source and a supply circuit for supplying the added Ac currents to the line of AC electromagnets. The floating body can be stopped at a desired position exactly with efficient conveyance.

7 Claims, 14 Drawing Sheets

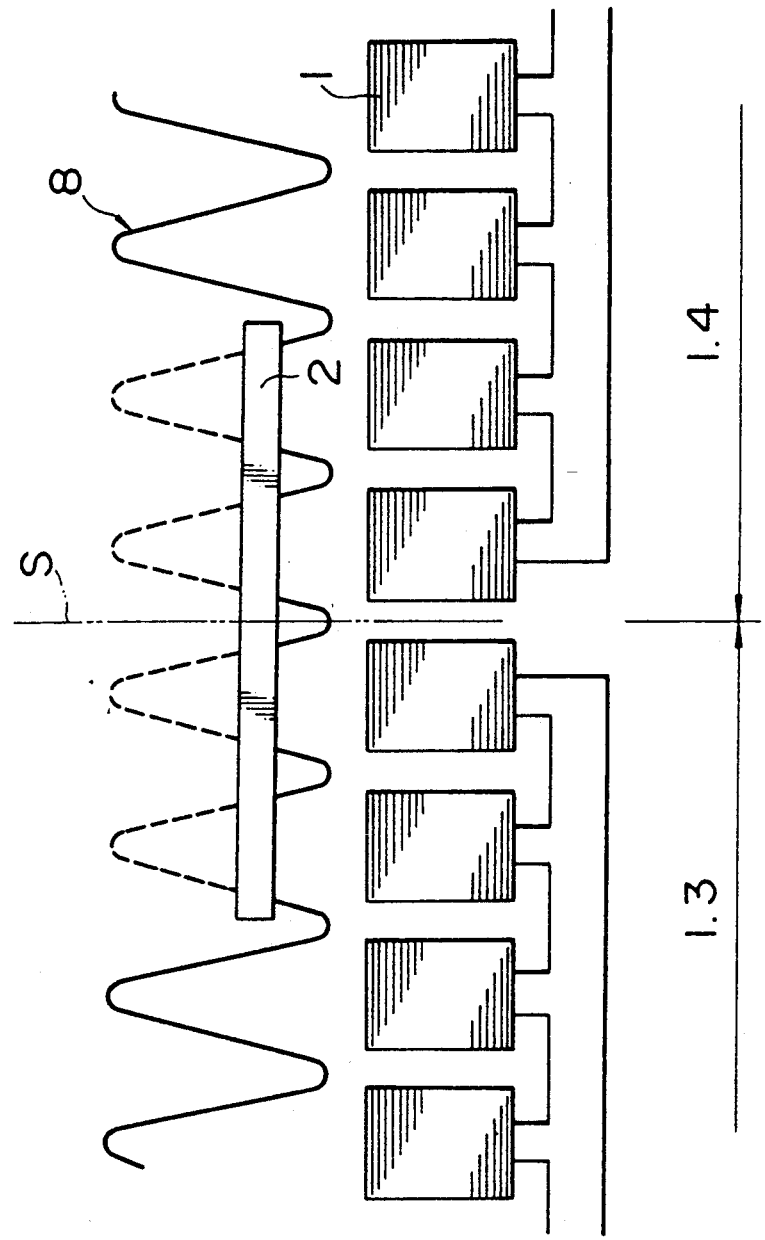

AC MAGNETIC FLOATING CONVEYOR AND OPERATION METHOD THEREOF

BACKGROUND OF THE INVENTION

1. Field of the Invention

The present invention relates to a wafer conveyor used in a semiconductor manufacturing apparatus in which dust scattering by conveyance has to be avoided, a vacuum conveyor in which the scattering of lubricating oil has to be avoided, a conveyor in a high temperature atmosphere and other conveyors used in a field required to convey an object without contact. Particularly, the present invention relates to an AC magnetic floating conveyor and its operation method for conveying a conductive floating body of nonmagnetic metallic material which is floated above a series of AC electromagnets and on which an object to be conveyed is placed.

2. Description of the Related Art

As a bearing used in a mechanism for conveying or moving an object, for example, such as a semiconductor wafer in a semiconductor manufacturing process line in which dust and oil scattering needs to be avoided, a so-called magnetic bearing using permanent magnets or electromagnets is employed. This employs the magnetic attraction or repulsion acting between magnets or between a magnet and magnetic material to float an object to be conveyed or a support object through space without contacting.

A number of patent applications have been filed for various inventions related to the magnetic conveyor and many of the inventions have been put into practice.

Of these inventions, magnetic bearing using an electromagnet has a merit that electric power necessary for operation of the magnetic bearing is small. However, since it is necessary to stabilize the inherently unstable attraction of the electromagnet by electric control, the magnetic bearing has drawbacks that a high-performance control circuit apparatus is required and many secondary devices such as a gap sensor are required. Specifically, when a conveyance distance is long, it is necessary to provide these control apparatuses over the whole conveyance line and accordingly there are many structural difficulties and economic problems.

As a countermeasure for avoiding such difficulties, a method is adopted in which a necessary control circuit and sensor are mounted on an object to be conveyed. In this case, however, it is necessary to provide a power supply unit such as a battery in the object and accordingly there occurs such a problem as that a charging system or a power supply system is further required.

On the other hand, if magnetic repulsion is utilized, the control apparatus as described above becomes in principle unnecessary and such an apparatus utilizing magnetic repulsion has a large advantage as a conveying mechanism for a long distance However, it is considered that a repulsive type floating mechanism made up only of permanent magnets cannot be realized in practice and the degree of freedom of at least one or more axes needs to be stabilized by the control circuit described above.

On the contrary, it is confirmed in principle that an induction repulsive type magnetic floating mechanism using an AC electromagnet can float a floating body and support it stably by devising a suitable shape of the floating body made of inductive material.

FIGS. 18 to 21 show an example of the induction repulsive type magnetic floating mechanism. In the figures, numeral 01 denotes an AC electromagnet and numeral 02 denotes a floating body to be conveyed. Light and high-conductive material such as aluminum is suitable for the floating body 02. An object to be conveyed is usually placed on the floating body 02. In the figures, when a single-phase AC current indicated by 04 of FIG. 20 is supplied to the AC electromagnets 01, an alternating magnetic field is generated above the electromagnets. Since the floating body is present in the magnetic field, an alternating current called an eddy current is generated in the aluminum material forming the floating body.

A magnetic field generated by the eddy current repels the magnetic field generated by the electromagnets. Accordingly, a floating force shown by F1 of FIGS. 18 and 19 acts on the floating body by this repulsion. When three phase alternating currents indicated by 05, 06 and 07 of FIG. 21 are supplied to three-phase electromagnets 03 of FIGS. 18 and 19, a moving force F2 of FIGS. 18 and 19 acts on the floating body 02 and the floating body is conveyed.

The foregoing is an example of the conventional AC magnetic floating conveyor of the induction repulsive type.

The above induction repulsive type magnetic floating conveyor requires the electromagnets for floatation and the electromagnets for movement separately and further requires power supplies separately. Accordingly, the whole mechanism is large and extremely expensive.

Further, in the AC magnetic floating conveyor, when the floating body is moved from a position to another position on a conveyance line, all the coils of the electromagnets disposed along the conveyance line are supplied with an AC current to be excited. In this case, because of extremely large inductance of the coils, there arises a problem that a power supply with large capacity is required in order to flow a predetermined current against this extremely large inductance. Furthermore, since electromagnets which do not contribute actually to float the floating body are also excited, there is a problem that power efficiency is very low and power is consumed very uselessly.

In a semiconductor process line, since it is necessary to transfer wafers between a conveyance path and a process apparatus, the accuracy of the position where the floating body is stopped is important for the transport of semiconductor wafers by the AC magnetic floating conveyor.

However, it is difficult to control a fine stop position of the floating by the known conventional method of gradually reducing the strength of the magnetic field component for movement of the floating body to simply zero because of an influence from the inertial force of the movement of the floating body. Accordingly, inaccuracy of stopping positions has been a problem.

SUMMARY OF THE INVENTION

In view of the above-mentioned problems in the conventional technology, it is an object of the present invention to provide an AC magnetic floating conveyor of an induction repulsive type which does not require a floatation stabilizing controller over the whole conveyance line and which is capable of effecting conveyance only by a conventional floating mechanism using AC electromagnets without a special power supply and which can be manufactured at a low cost.

It is another object of the present invention to provide an AC magnetic floating conveyor capable of effecting conveyance effectively with a minimum requisite power capacity.

It is still another object of the present invention to provide a method of controlling a stop position of a floating body with high accuracy in an AC magnetic floating conveyor.

In order to achieve the objects, according to the present invention, the following basic measures are taken.

In the AC magnetic floating conveyor utilizing an alternating magnetic field of AC electromagnets to float and convey a conductive floating body of paramagnetic or nonmagnetic metallic material, three-phase AC currents with two frequency components which can be obtained by adding a single-phase AC current having, for example, a relatively high frequency for floating the floating body and three-phase AC currents having, for example, a relatively low frequency for moving the floating body are employed.

More particularly, the AC currents having two frequency components are employed to excite the AC electromagnets arranged in the conveyance direction. Accordingly it is not necessary to provide the electromagnets for floatation and the electromagnets for movement separately. The conveyance line can be realized with a simple configuration, and a single power supply can be used for both of the floatation and the movement together with the electromagnets, so that the cost can be reduced greatly.

Further, in order to convey the floating body efficiently, attention is paid to the fact that the floating body can be floated and moved by driving only the electromagnets just under the floating body while switching on and off the electromagnets in accordance with movement of the floating body, and the present invention provides a conveyor including detection means for detecting a position of the floating body; that is, a series of sensors disposed along, for example, the conveyance line (a line of electromagnets) to detect the floating body and which sequentially excites electromagnets necessary for floating and conveying the floating body on the basis of the position of the floating body detected in accordance with an output from the series of sensors (detection means).

According to the present invention, the electromagnet line is electrically divided into a plurality of sections having a pitch longer than at least the length of the floating body in the conveyance direction and is energized in a section unit to be driven selectively.

More particularly, the apparatus of the present invention detects the position of the floating body on the basis of the output from the series of sensors to decide which electromagnet section is necessary to float and convey the floating body and energizes the electromagnet section to excite all of the electromagnets in the section. Such operations are repeatedly made by the apparatus. In this manner, by sequentially energizing the electromagnet section in accordance with the position of the floating body to be floated and conveyed, the floating body can be floated and conveyed stably without excitation of all electromagnets on the conveyance line.

Further, in the conveyor in which AC electromagnets are divided into a plurality of sections along the conveyance line with a predetermined length and a single-phase AC current for floatation and three-phase AC currents for movement are supplied to the section to float and convey the floating body; according to a method of stopping the AC magnetic floating body of the present invention, when the floating body is to be stopped, the single-phase AC current for floatation and the three-phase AC currents for movement are supplied to the sections up to a predetermined stop position, and a single-phase AC current for floatation and three-phase AC current for backward movement are supplied to the section exceeding the stop position, so that the floating body is stopped between the section supplied with the three-phase AC currents for forward movement and the three-phase AC currents for backward movement. Further, by setting the length of the floating body in the conveyance direction to a distance between a weak portion of the single-phase AC magnetic field and another weak portion thereof at the stop position, the floating body can be held in the stop position by turning the three-phase AC currents off when the floating body is to be stopped.

With the above method, when the single-phase AC current for floatation and the three-phase AC currents for movement are supplied to the section in the vicinity of the floating body in order to move the floating body in a predetermined direction, the floating body is floated by the electromagnetic operation and is conveyed in the movement direction by the electromagnetic operation of the magnetic field for the movement direction.

On the other hand, when the floating body is stopped between predetermined sections, the single-phase AC current for floatation and the three-phase AC currents for backward movement are supplied to the section located just beyond the predetermined stop position. Thus, the floating body conveyed to the vicinity of the stop position receives backward force above the section supplied with the three-phase AC currents for backward movement, so that the floating body is stopped between the section supplied with the three-phase AC currents for movement and the section supplied with the three-phase AC currents for backward movement. In this manner, the floating body can be stopped at the predetermined stop position with high accuracy.

Further, by defining the relation between the length of the floating body and the pitch of the arranged electromagnets as described above, when the floating body is stopped at the predetermined stop position and the three-phase AC currents for the sections before and after the stop position are cut off, the floating body is floated by the single-phase AC magnetic field. In this case, the magnetic field at the front and rear ends of the floating body is weak, and accordingly if the floating body is drifted slightly in the forward direction, the front end of the floating body receives the gradually increased magnetic field and therefore the backward force acts on the floating body so that the floating body is returned to the original position. Thus, the floating body is held at the stop position stably with high accuracy.

BRIEF DESCRIPTION OF THE DRAWINGS

FIG. 17 is a diagram showing a partial configuration of a sixth embodiment of the present invention;

DETAILED DESCRIPTION OF THE PREFERRED EMBODIMENTS

Embodiments of the present invention will be now described with reference to drawings.

Figure 1:
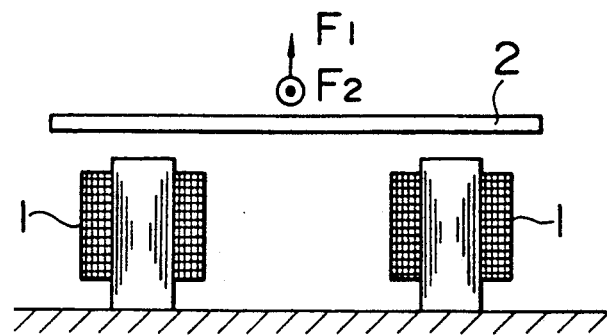
FIGS. 1 to 3 are diagrams for schematically illustrating a basic configuration of a magnetic floating conveyor according to the present invention.
Figure 2:
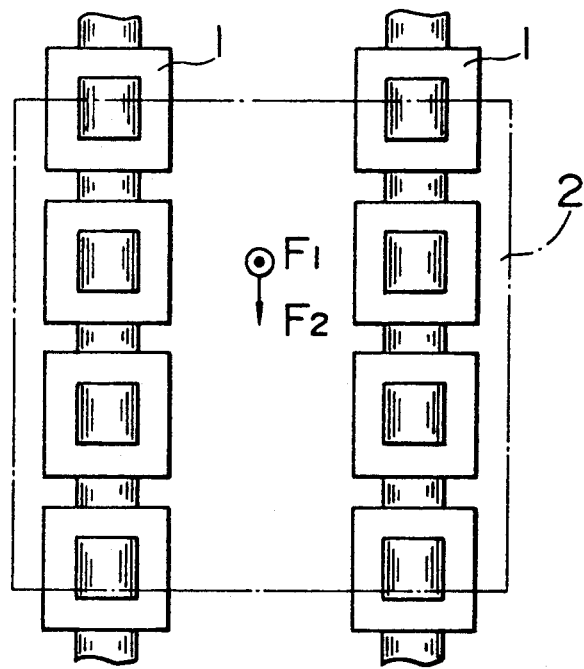
Figure 3A:
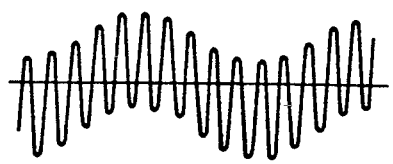
Figure 3B:
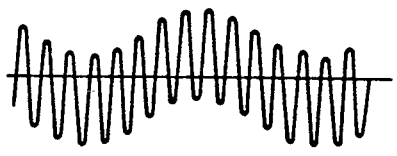
Figure 3C:
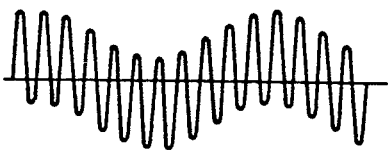

According to a basic configuration of the present invention, as shown in FIGS. 1 to 3, in an AC magnetic floating conveyor for floating and conveying a conductive floating body 2 of paramagnetic or nonmagnetic metallic material by utilizing alternating magnetic fields of AC electromagnets 1, three-phase AC currents (a), (b) and (c) obtained by adding a single-phase AC current having, for example, a relative high frequency for floating the floating body and three-phase AC currents having, for example, a relatively low frequency for moving the floating body are employed as AC current supplied to an array of AC electromagnets arranged in a conveyance direction, each of the three-phase AC currents (a), (b) and (c) having two frequency components.

Figure 4:
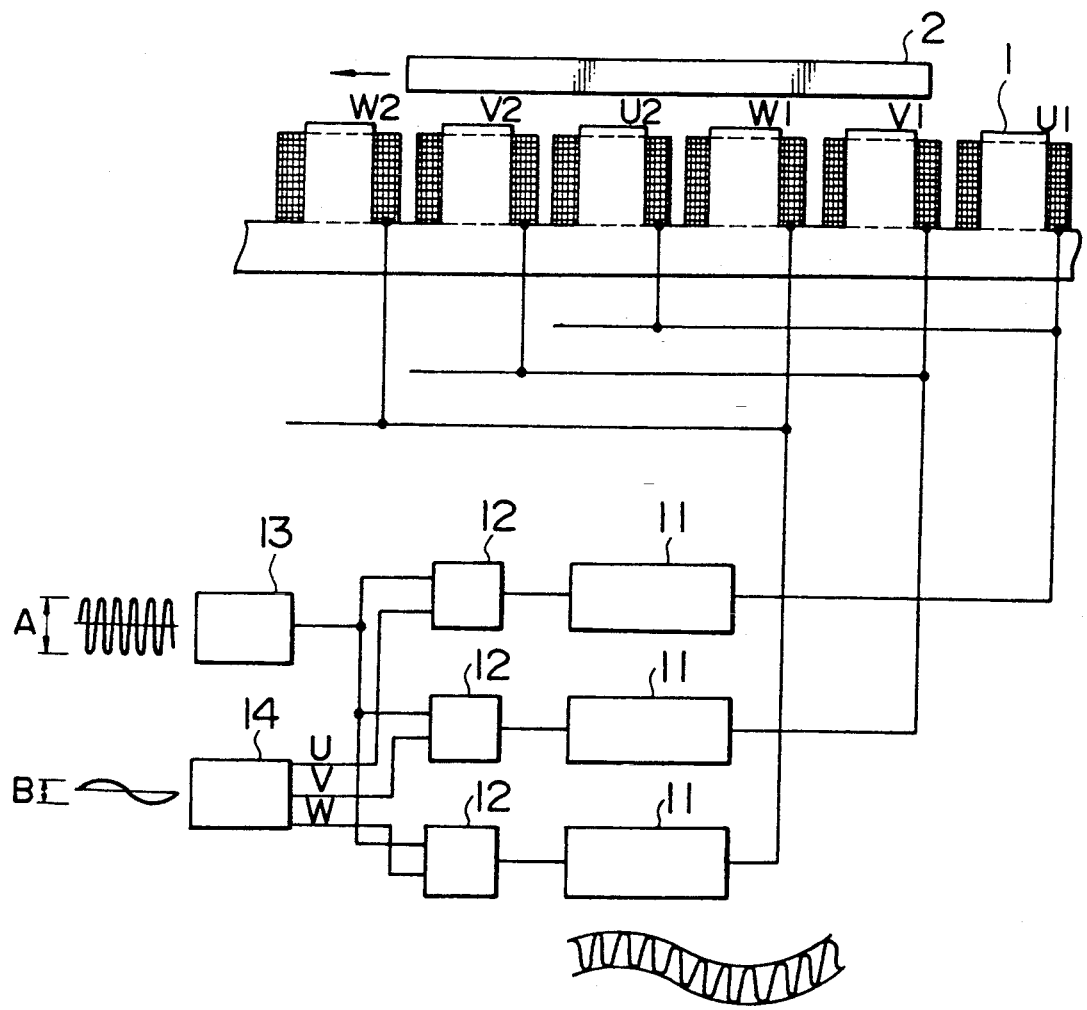
FIGS. 4 and 5 schematically illustrate a configuration and operation according to a first embodiment of the present invention.

FIG. 4 shows a first embodiment of the present invention.

In FIG. 4, numeral 1 denotes a series of electromagnets for floatation and movement and having yokes on which excitation coils U1, U2, ..., V1, V2, ..., W1, W2, ... are wound. The winding system thereof is a three-phase system of U, V and W and the coils are connected so that when U1 is N pole, U2 becomes S pole, U2 N pole, and so on. Numeral 11 denotes a current amplification power supply unit, 12 a signal adder, 13 a single-phase oscillator, and 14 a three-phase oscillator.

The single-phase oscillator 13 generates a single-phase AC signal of 50 to 150 Hz necessary for floating the floating body 2. The three-phase oscillator 14 generates three-phase AC signals of 50 Hz or less necessary for moving the floating body 2. The signals generated by the oscillators 13 and 14 are added in the signal adder 12 and supplied to the current amplification power supply units 11.

The current amplification power supply units 11 amplify the added single-phase and three-phase currents to supply the currents to the coils. Intensities of the two added currents are adjusted by changing levels of the oscillators 13 and 14 as described later.

Operation of the apparatus structured as above is now described.

The AC electromagnets 1 arranged in the conveyance direction as shown in FIG. 4 are supplied with the three-phase AC currents (a), (b) and (c) shown in FIG. 3 repeatedly in the order of the current (a) corresponding to the U phase of the three phase, the current (b) corresponding to the V phase and the current (c) corresponding to the W phase.

The high frequency component included in the three-phase AC currents (a), (b) and (c) is an optimal frequency for floatation of the floating body 2 and has the same phase for the currents (a), (b) and (c) in FIG. 3. Thus, eddy current is generated in aluminum material of the floating body 2 and the floating body repels the AC electromagnets 1. A floating force shown by F1 of FIG. 1 acts on the floating body 2 and the floating body 2 is floated.

As a frequency of a current for the AC electromagnets capable of obtaining the floating force F1 for floating the floating body 2, there is known that an optimal value exists depending on material of the floating body 2 and a thickness thereof. When the frequency is too high, the floating force F1 is reduced. When the floating body 2 is made of aluminum, the optimal frequency is about 50 to 150 Hz.

On the other hand, a low frequency component included in the three-phase AC currents (a), (b) and (c) (FIG. 3) is the three-phase AC currents for moving the floating body 2 at a low speed. A moving magnetic field is produced above the AC electromagnets 1 by the three-phase AC currents. A force shown by F2 of FIG. 1 acts on the floating body 2 by the moving magnetic field and the eddy current flowing in the floating body 2 by the moving magnetic field so that the floating body 2 is moved above the AC electromagnets 1 arranged in the conveyance direction.

The moving force F2 for moving the floating body 2 is obtained by the three-phase AC currents, while if the frequency thereof is high, the moving speed of the floating body is high and it is difficult to control movement and stop of the floating body 2. Accordingly, in order to easily control the floating body 2, it is necessary to drive the floating body by the three-phase AC currents having a low frequency and move the floating body at a low speed.

Further, when the floating body 2 is made of aluminum, the optimal floating frequency is 50 to 150 Hz. However, with this frequency, the moving speed may be too high and it is difficult to control the floating body 2. The optimal frequency for movement is 50 Hz or less.

Figure 5:
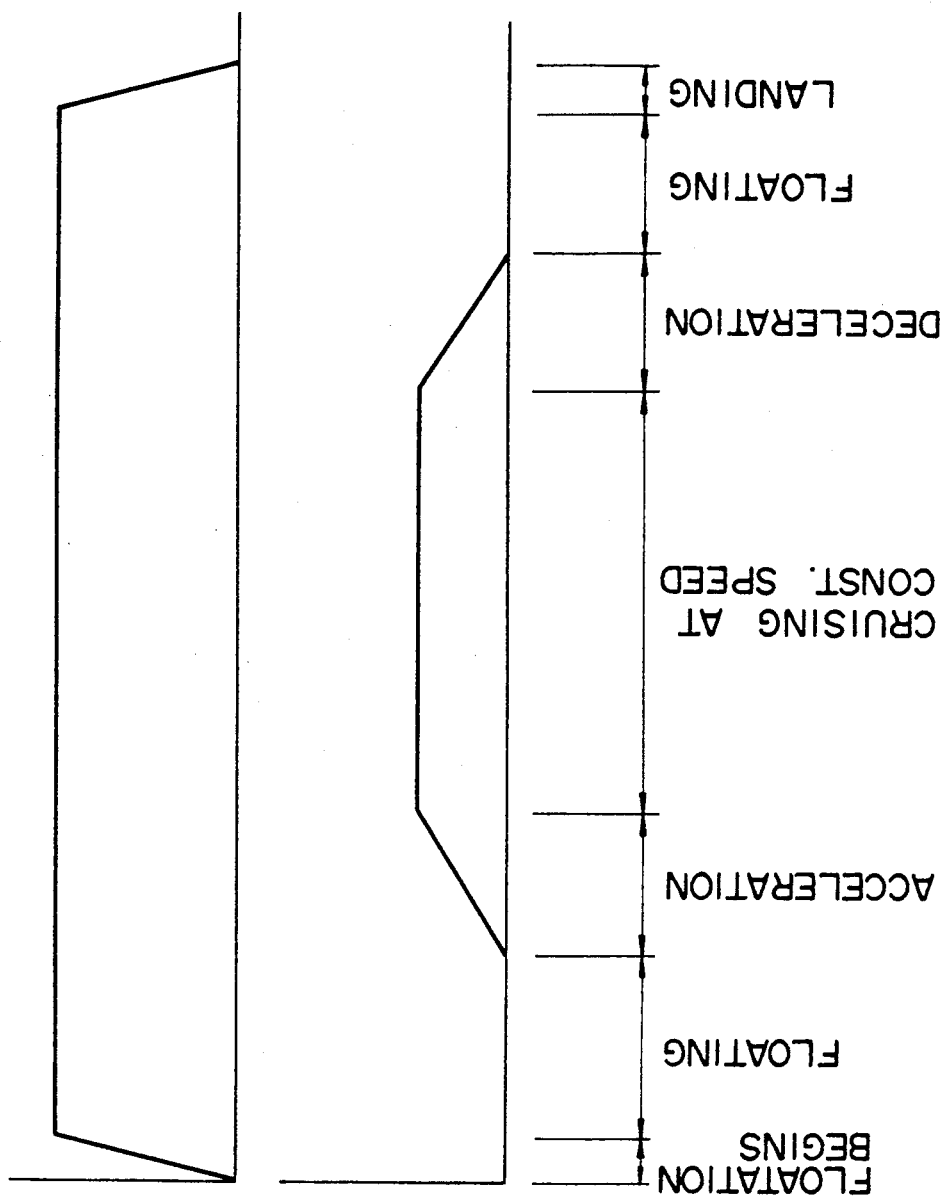

FIG. 5 shows the current intensity patterns in accordance with the moving mode of the floating body 2. In FIG. 5, A represents the single-phase excitation current intensity for floatation and B represents the three-phase excitation current intensity for movement. Usually, because the moving frictional force is small in the floating state, the considerably small three-phase excitation current intensity B for movement is employed as compared with the single-phase excitation current intensity A for floatation.

When the current intensity B is set to zero and the current intensity A is gradually increased to a set value, the floating body 2 is floated. In the floated state, when the current intensity B is gradually increased, moving force acts on the floating body 2 and the floating body 2 moves. When the movement of the floating body 2 is to be stopped, the current intensity B is gradually reduced. Further, when the movement direction of the floating body is changed to be reversed, it can be made by replacing connections for two phases (for example, U-phase and W-phase) of the three phases.

Figure 6:
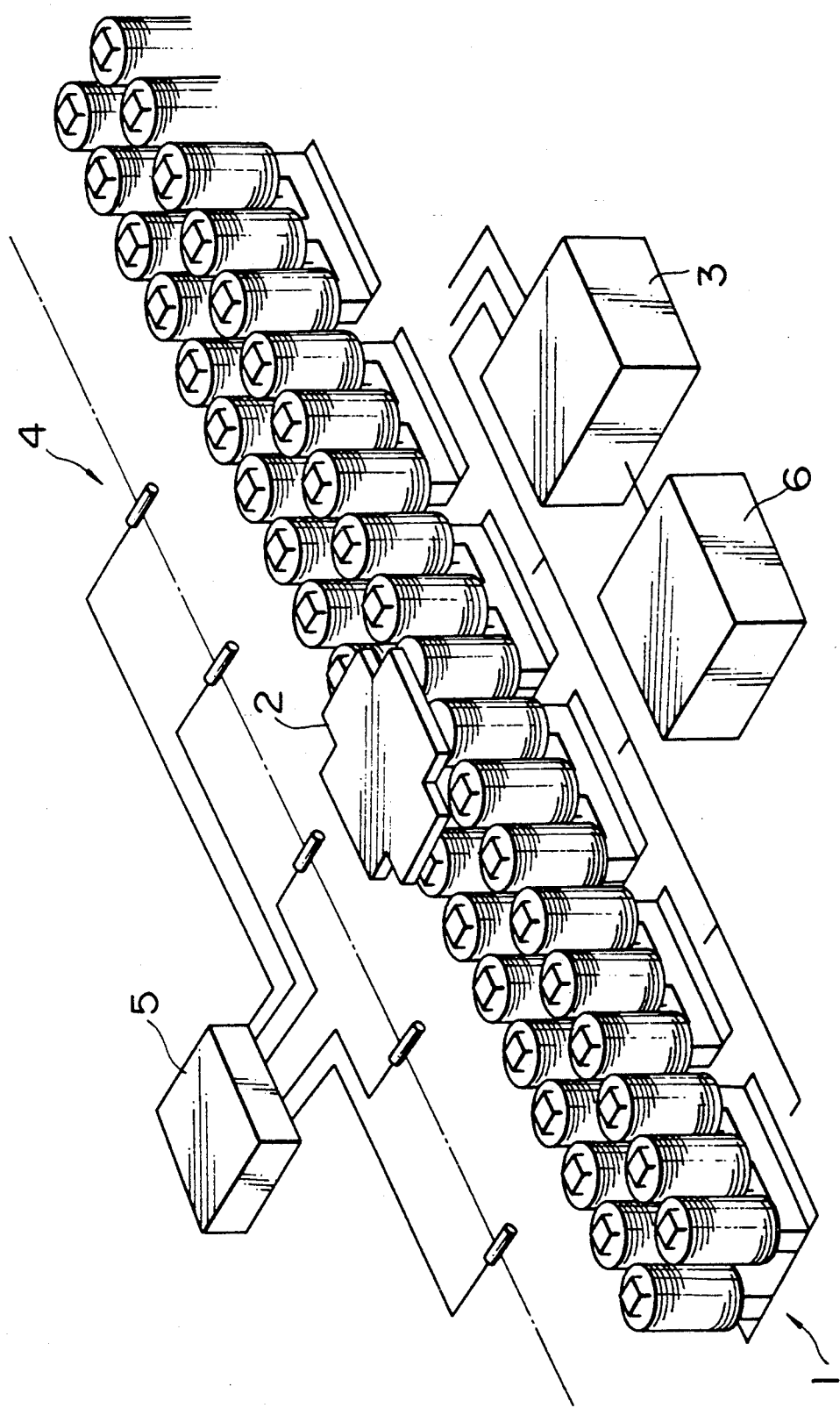
FIG. 6 is a perspective view showing a basic configuration of an AC magnetic floating conveyor according to a second embodiment of the present invention.

FIG. 6 is a perspective view showing a basic configuration of a second embodiment of an apparatus of the present invention. In FIG. 6, numeral 1 denotes a series of AC electromagnets for generating an AC variable magnetic field and which constitutes a conveyance line of the floating body 2 to be described. The series of electromagnets is electrically divided into a plurality of sections (sections of electromagnets) in the direction of the line and the electromagnets are energized in a unit of section. Numeral 2 denotes a floating body which floats and moves above the series of electromagnets 1 while an object to be conveyed is placed on the floating body 2, and numeral 3 denotes a power supply unit for supplying current to selected electromagnet sections of the series of electromagnets. Numeral 4 denotes a floating body detection sensor disposed along the series of electromagnets 1 (conveyance line) to detect passage of the floating body 2 and measure the position of the floating body 2, numeral 5 denotes a change-over signal generator for generating a change-over signal for switching the electromagnet section to be energized on the basis of the detection signal of the floating body detection sensor 4, and numeral 6 denotes a change-over device for switching the electromagnet sections to be energized on the basis of the change-over signal generated by the change-over signal generator 5. While not shown, it is a matter of course that the change-over device 6 is electrically connected to the change-over signal generator 5.

In FIG. 6, the floating body detection sensors 4 are disposed along the side of the electromagnet line 1, while the sensors 4 may be disposed above the electromagnet line 1 or under the electromagnet line 1 as far as the sensors 4 can detect the floating body 2, and the disposition of the sensors 4 is not limited to the disposition of FIG. 6.

Figure 7:
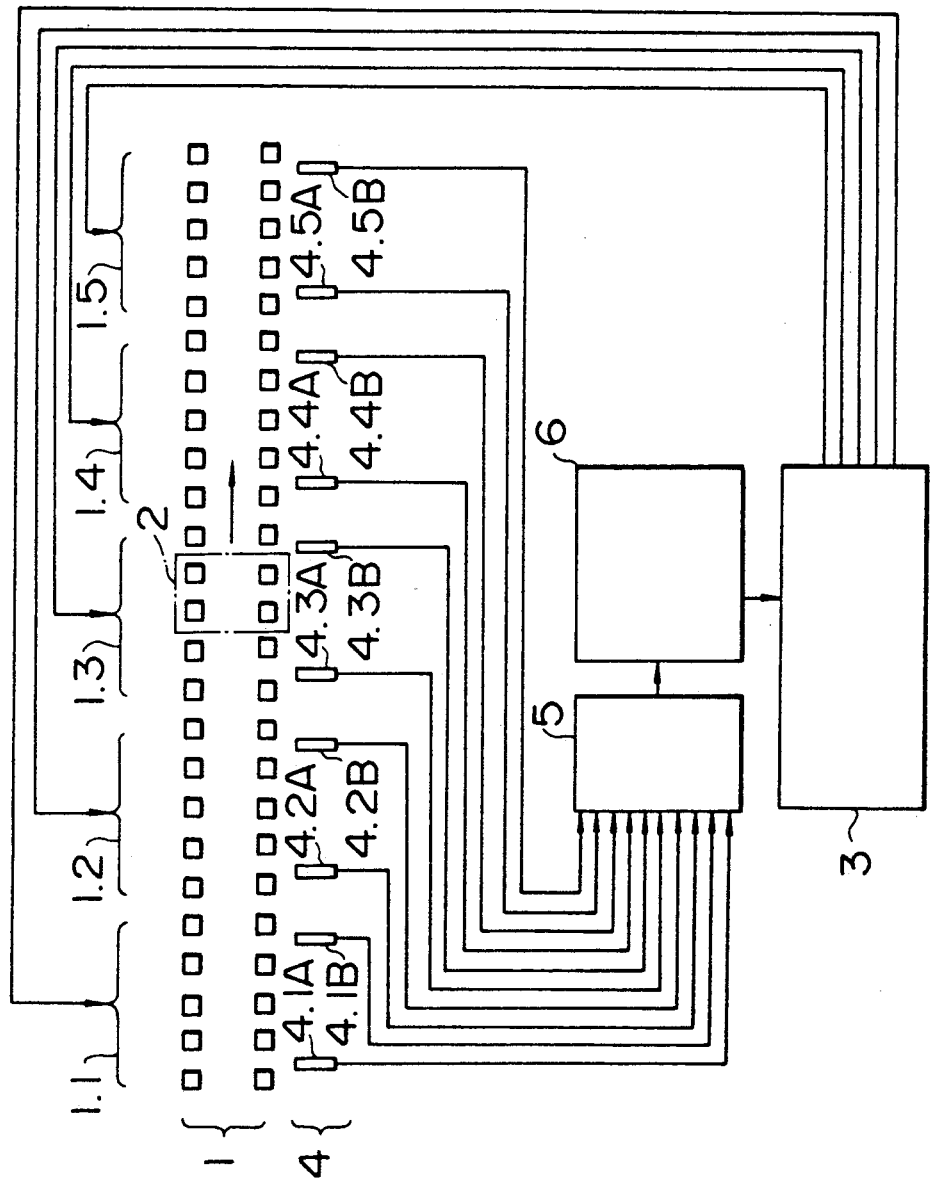
FIG. 7 is a block diagram showing a configuration of an AC magnetic floating conveyor according to the second embodiment of the present invention.

FIG. 7 is a block diagram for explaining operation of the AC magnetic floating conveyor shown in FIG. 6 and shows five sections 1.1 to 1.5 constituting the electromagnet line 1. In FIG. 7, for the convenience of description, it is noted that five yokes in the conveyance direction of the two lines of electromagnets 1 constitute one section and it is different from FIG. 6. The length of each of the sections 1.1 to 1.5 is selected to be longer than at least the length of the floating body 2 in the conveyance direction. The length of the floating body 2 in the conveyance direction is equal to the length corresponding to two yokes. In FIG. 7, the two floating body detection sensors required to detect the passage of the floating body 2 are disposed for each section (one sensor is disposed at the front portion of the section and the other sensor is disposed at the rear portion of the section), and these floating body detection sensors constitute the floating body detection sensor line 4. In FIG. 7, 4.1A and 4.1B to 4.5A and 4.5B are the floating body detection sensors disposed corresponding to the sections 1.1 to 1.5, respectively. The detection sensor may be of optical type or induction magnetic field type. However, it is preferable that the detection sensor is reliable and not influenced by the magnetic field of the electromagnet.

Figure 8:
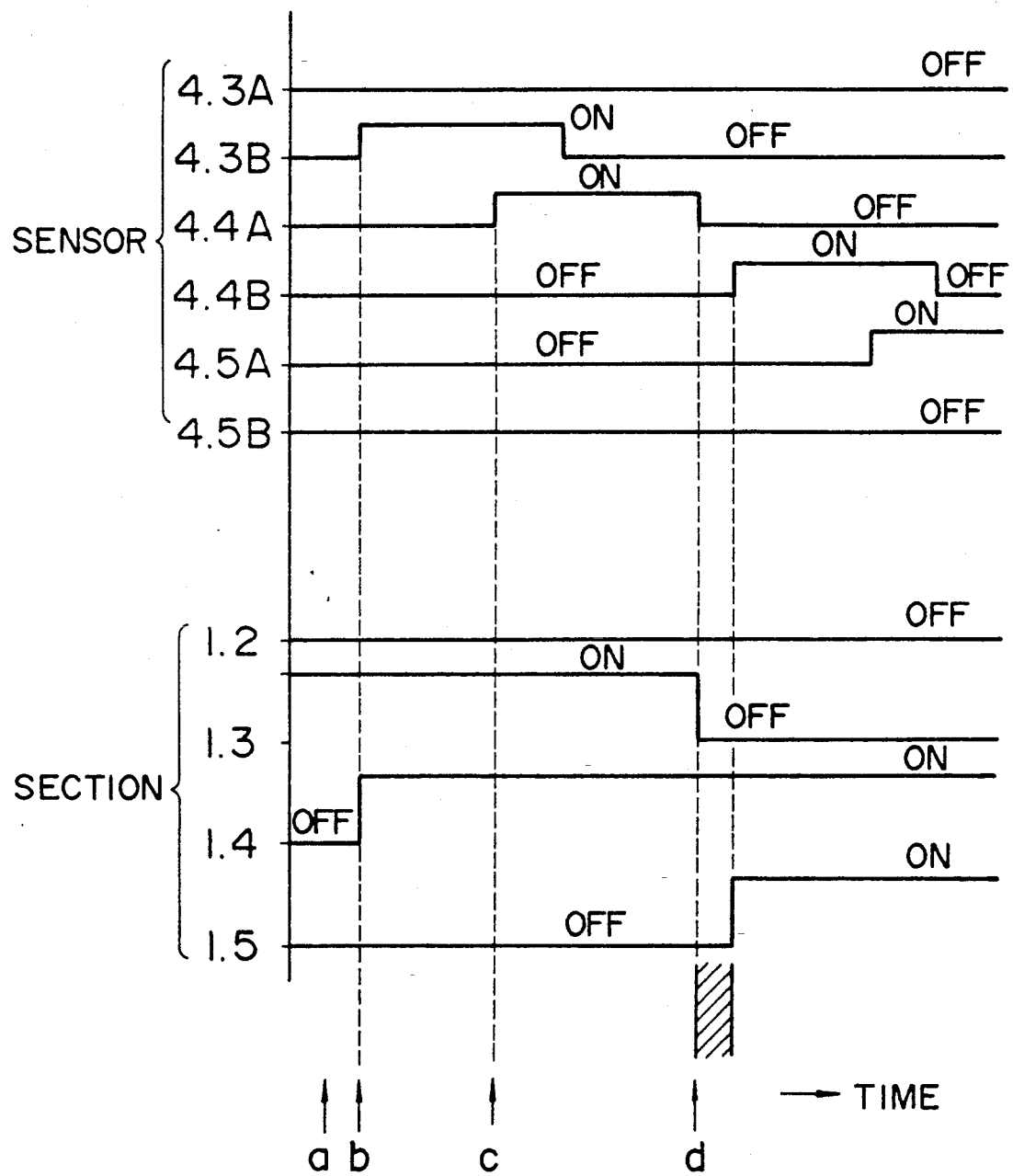
FIG. 8 is a timing chart for explaining operation of the AC magnetic floating conveyor according to the second embodiment.

Operation of the AC magnetic floating conveyor as shown in FIG. 6 is now described with reference to the block diagram of FIG. 7 and a timing chart of FIG. 8.

At time a, it is assumed that the floating body 2 is being moved along the electromagnet line 1 (conveyance line) in the direction shown by an arrow of FIG. 7. In the state of time a, only the section 1.3 is operated as shown in FIG. 8. The floating body 2 is further moved in the arrow direction of FIG. 7, and when the leading end of the floating body 2 reaches the detection position of the floating body detection sensor 4.3B at time b, the sensor 4.3B becomes on to produce an effective floating body detection signal as shown in FIG. 8. The change-over signal generator 5 generates a change-over signal for operating the next section 1.4 in response to a rising edge of the floating body detection signal from the floating body detection sensor 4.3B. Consequently, the change-over device 6 supplies a current from the power supply unit 3 to the section 1.4 so that the section 1.4 is energized as shown in FIG. 8 and begins to be operated. At this stage, the section 1.3 is also still in operation.

When the floating body 2 proceeds further and the leading end of the floating body 2 reaches the detection position of the floating body detection sensor 4.4A at time c, the sensor 4.4A becomes on. Thus, when the floating body 2 passes through the floating body detection sensor 4.4A at time d and the sensor 4.4A becomes off; that is, when the whole of the floating body 2 passes through the section 1.3 and is positioned above the next section 1.4, switching by the change-over device 6 is made in response to the falling edge of the detection signal of the sensor 4.4A, and power supply to the section 1.3 is cut off. Consequently, only the section 1.4 is energized.

More particularly, when the floating body 2 is floated and moved astride two adjacent sections, the two sections are energized and operated. When the floating body 2 passes through the preceding section and enters the subsequent section, the power supply to the preceding section is stopped. This operation (called the division drive operation) is sequentially performed in succession. With the succession of the sequential operation, the floating body 2 is floated and moved above the conveyance line (electromagnet line 1) without the supply of power to all the sections at once.

When the floating body is also moved in the reverse direction with respect to the above-mentioned direction, the operation remains quite the same. However, a command for the moving direction is given, and the duties of the two sensors (one sensor disposed at an end in the conveyance direction of the section and the other sensor disposed at the other end) disposed for each section can be selected on the basis of the command (or the moving direction signal by the command). That is, the duties of operation at the rising o falling edge are selected in response to the entry into or leaving from a certain section of the floating body.

In the starting of the conveyance, the floating body 2 is set to the vicinity of the center of a certain section and a section number designating the section is inputted so that the electromagnets of the section designated by the inputted section number are energized. Thus, after the movement of the floating body 2 is started by supplying power to the electromagnets, the floating body is operated in accordance with the sequence described above.

Figure 9:
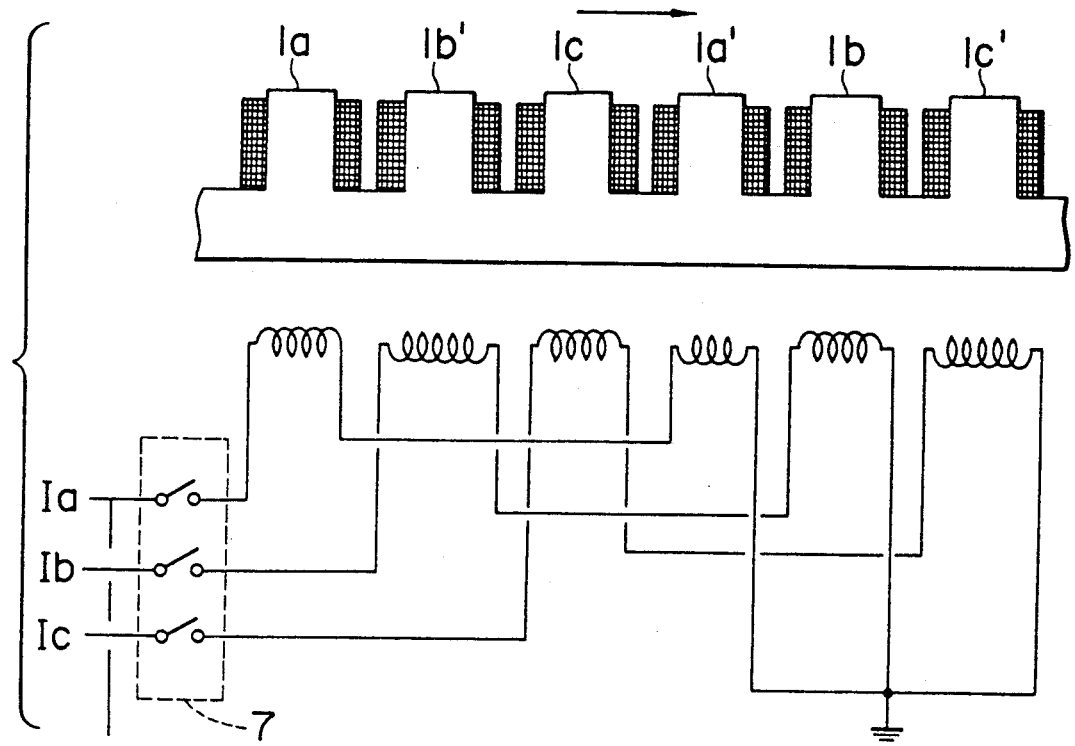
FIG. 9 is a diagram for explaining a connection structure of a plurality of electromagnets constituting one section in the second embodiment.

Referring now to FIG. 9, an example of the connection of the plurality of electromagnets constituting one section is described.

FIG. 9 shows a part of one line of the two lines of electromagnets as shown in FIG. 7 and one section is constituted of six yokes. In FIG. 9, 1a, 1b and 1c represent three-phase AC currents which are supplied to the coils through switches 7 included in the change-over device 6 shown in FIGS. 6 and 7. The connection system of FIG. 9 belongs to a category of a concentrated winding used in a common linear motor and corresponds to a two-pole three-phase system.

In the connection system of FIG. 9, when the switches 7 are turned on, a moving magnetic field is produced above the electromagnets 1a, 1a', 1b, 1b', 1c and 1c' in the direction shown by the arrow, so that the floating body 2 is floated and at the same time the floating body is moved in the direction of the arrow. The turning on and off of the switches 7 is made by the change-over signal from the change-over signal generator 5 in accordance with the sequence described above.

The length of the section is equal to two poles in FIG. 9, while a four-pole three-phase system having two sets of the configuration of FIG. 9 connected in series or in parallel and a six-pole three-phase system having three sets of the configuration of FIG. 9 connected in series or in parallel can also be considered. However, in accordance with the object of the present invention, if the electromagnet line is divided with the smaller number of poles, the efficiency is improved. However, there is a trade-off with the movement speed of the floating body 2 and accordingly the number of poles cannot be too small. This is because since the rising characteristic of a current flowing through the coil is determined by the inductance and resistance of the coil and the current does not flow immediately even if the switch 7 is closed, it is required to adopt a configuration in which the floating body 2 enters into a particular section after a current supplied to the electromagnets constituting the section is increased sufficiently.

With respect to a winding method of the coils, there is a method called distributed winding in addition to the above winding method. Further, there exist various connection systems such as a delta connection, a star connection (shown in FIG. 9) and the like, and it is a matter of course that any connection system can be applied to the present invention.

Figure 18:
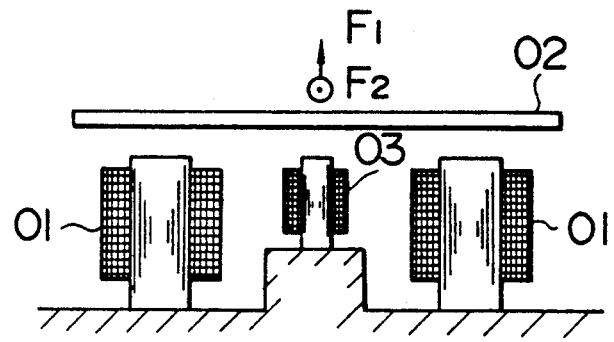
FIG. 18 is a front view of a conventional apparatus.
Figure 19:
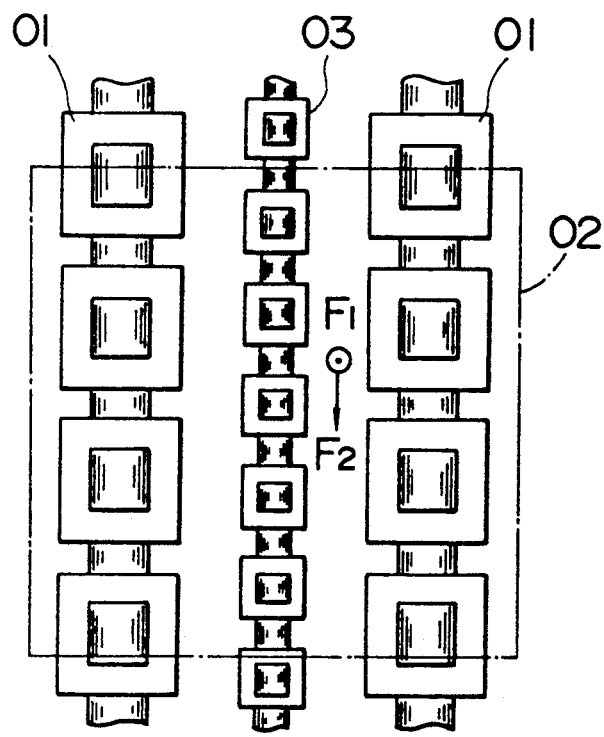
FIG. 19 is a plan view of the conventional apparatus of FIG. 18.
Figure 20:
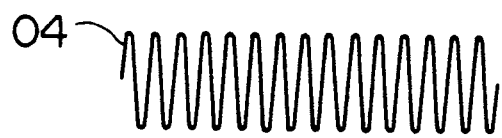
FIG. 20 is a diagram showing a waveform of a floating current in the conventional apparatus of FIG. 18.
Figure 21:
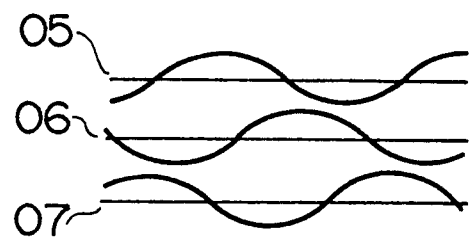
FIG. 21 is a diagram showing waveforms of three-phase AC currents for conveyance in the conventional apparatus of FIG. 18.

The foregoing has described the embodiment in which the electromagnets are utilized for floatation and movement of the floating body, while the present invention can be applied to the AC magnetic floating conveyor having the electromagnet line 01 for floatation and the linear motor 03 constituted of the electromagnet line for movement provided separately as shown in FIGS. 18 and 19. In this case, both of the electromagnet line 01 for floatation and the linear motor (electromagnet line) 03 for movement can be of the above-mentioned division drive system and only the electromagnet line 01 for floatation can be of the division drive system. The electromagnet line 01 for floatation may be supplied with the single-phase AC current and is not required to consider the number of poles such as the division in the case of the three phases as described in FIG. 9. Thus, it is characterized that the electromagnet line 01 for floatation can be divided into a considerably small unit.

The merits of dividing the electromagnet line into the electromagnets for floatation and the electromagnets for movement can control the floating force and the moving force separately, and the conveyance speed and the stop position can be controlled easily. When the floating body 2 is floated in the air, the resistance in the movement direction is very small and the linear motor 03 having a relatively small capacity can be used in practice.

Figure 10:
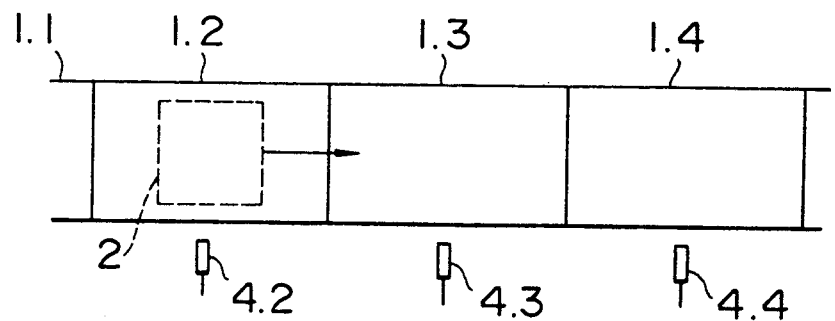
FIG. 10 schematically illustrates an AC magnetic floating conveyor according to a third embodiment of the present invention

In the configuration of FIG. 7, the two floating body detection sensors for detecting the position of the floating body 2 are provided in each section, while one floating body detection sensor may be provided in each section. FIG. 10 shows a configuration of a part of a third embodiment of the present invention having such a configuration. In FIG. 10, numerals 4.2 to 4.4 denotes floating body detection sensors provided corresponding to the sections 1.2 to 1.4, respectively. The detection sensors 4.2 to 4.4 are disposed in positions corresponding to, for example, a center of the sections 1.2 to 1.4 along the conveyance direction of the floating body 2. The length of the floating body 2 in the conveyance direction is smaller than the length of each of the sections in the conveyance direction and is, for example, a half or less thereof.

Figure 11:
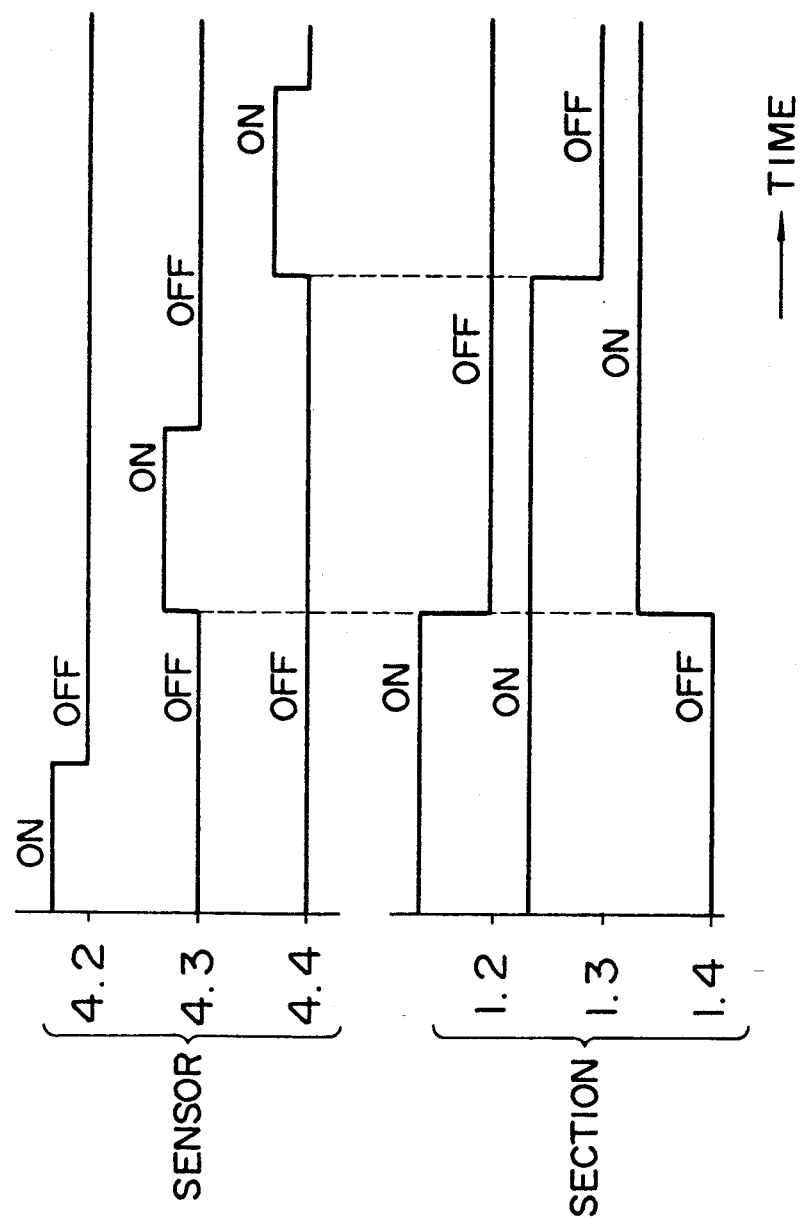
FIG. 11 is a timing chart for explaining operation of the conveyor of FIG. 10.

Referring now to the timing chart of FIG. 11, the sequence of section switching (division drive) in the configuration of FIG. 10 is described.

It is assumed that the floating body 2 is positioned above the section 1.2 as shown in FIG. 10, and therefore the floating body detection sensor 4.2 has been in the on state due to the detection of the floating body 2. At this time, the section 1.2 in which the floating body 2 is located and the next section 1.3 are energized as shown in FIG. 11. Then, the floating body 2 is moved in the direction of arrow of FIG. 10, and when the floating body 2 is detected by the floating body detection sensor 4.3, the sensor 4.3 becomes on. The section 1.4 next to the present section 1.3 is energized as shown in FIG. 11 and at the same time the section 1.2 through which the floating body 2 has passed is turned off. In the embodiment, since the length of the floating body 2 in the conveyance direction is a half or less that of the section, when the sensor 4.3 becomes on, the floating body 2 has passed certainly and accordingly there is no problem even if the section 1.2 is turned off (the supply of power thereto is cut off). In this system, two adjacent sections are always energized as shown in FIG. 11. Selection of turning on and off of the section by the detection signal of the sensors may be made by some signal representative of the moving direction of the floating body 2 in the same manner as the second embodiment in which two floating body detection sensors are disposed in each section.

Figure 12:
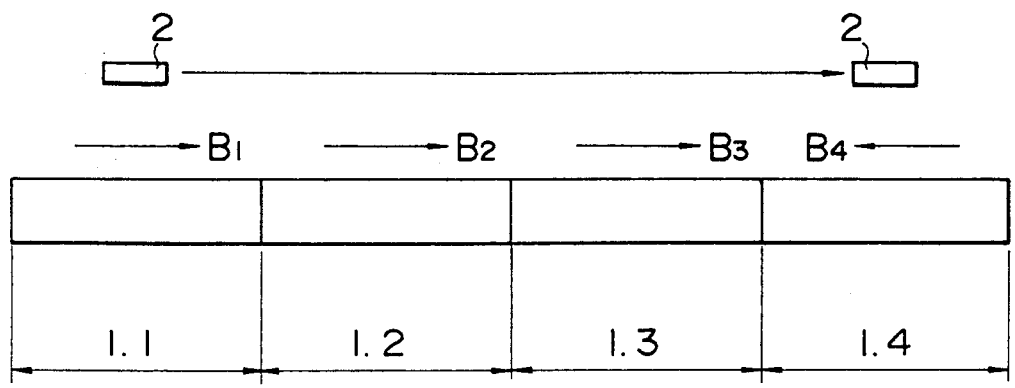
FIG. 12 is a diagram showing an operation principle of a fourth embodiment of the present invention.

Three examples of the method of stopping the floating body according to the present invention are now described In the apparatus of the present invention as described above, the floating body 2 can be stopped by the following method. In FIG. 12, the electromagnet line 1 is electrically divided into sections (blocks). The sections (blocks) of the electromagnet line arranged in the moving direction of the floating body 2 are represented by 1.1, 1.2, 1.3 and 1.4. When the floating body 2 moves from the electromagnet section 1.1 to the section 1.4, the direction of the moving magnetic field generated by the three-phase AC currents is set to the direction of arrows of $B_1$, $B_2$, $B_3$ and $B_4$ in the sections, so that the floating body 2 is moved from the section 1.1 to the section 1.4 on the basis of the above-described moving principle. As the moving speed of the floating body 2 is gradually reduced after the floating body 2 comes into the electromagnet block 1.4, the strength of the moving magnetic field acting on the floating body in the section 1.4 is gradually reduced from the original strength $B_4$, and when the floating body 2 is stopped, the strength of the moving magnetic field is controlled to be reduced to zero so that the floating body stops.

In this method, however, the stop position of the floating body is determined by the trade-off of the inertial force of the floating body movement and the strength ($B_4$) of the magnetic field acting on the floating body as a braking force. Accordingly, the accuracy of the stop position is not necessarily high.

When higher accuracy is required for the stop position, the floating body can be stopped in accordance with the procedure of a fifth embodiment which will be described below with reference to FIGS. 13 to 16 by the operation method of the present invention.

Figure 13:
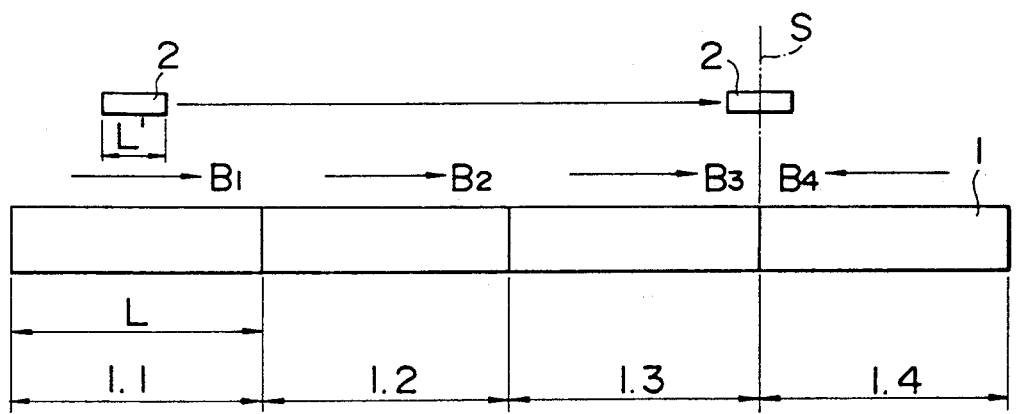
FIG. 13 is a diagram showing an operation principle of a fifth embodiment of the present invention.
Figure 14:
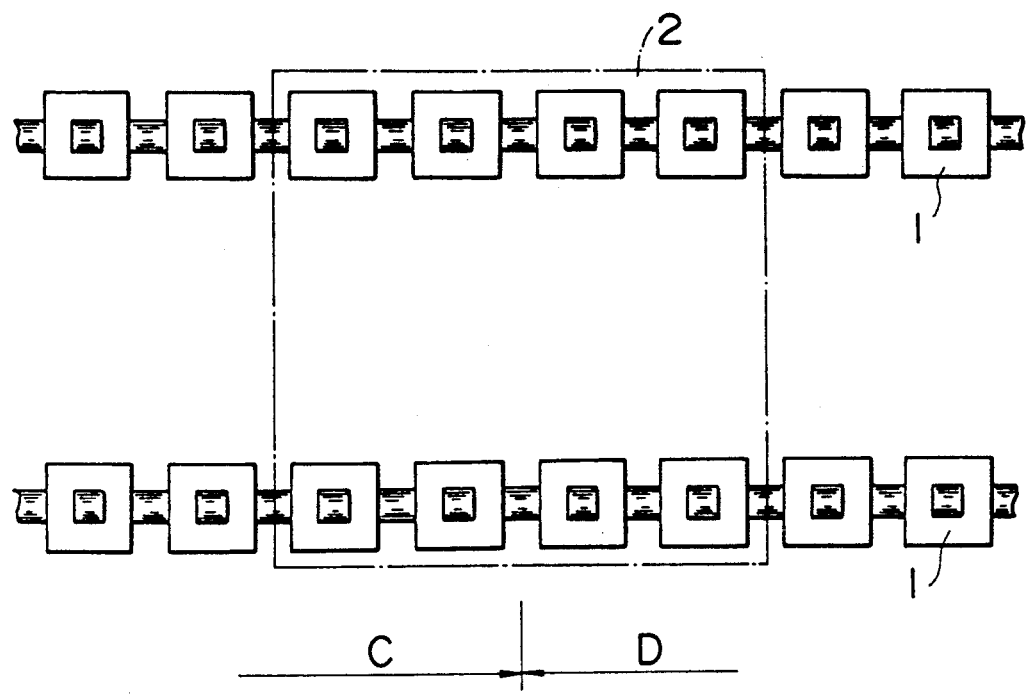
FIG. 14 is a partial plan view of the embodiment of FIG. 13.
Figure 15:
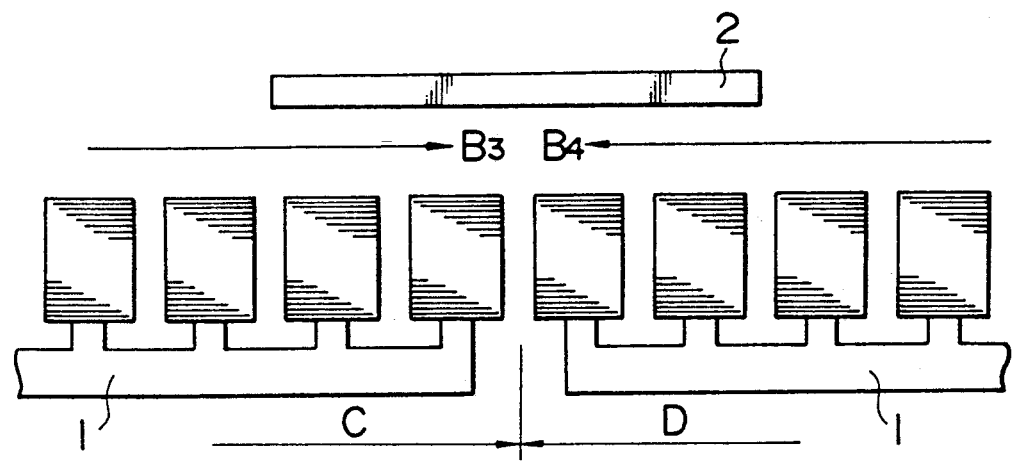
FIG. 15 is a partial side view of the embodiment of FIG. 13.

FIG. 13 is a side view showing the entire configuration, FIG. 14 is a partial plan view showing details, FIG. 15 is a side view of FIG. 14, and FIG. 16 is a diagram explaining operation of position detection.

As shown in FIG. 13, the line of electromagnets 1 arranged along the conveyance direction is divided into sections each having a plurality of electromagnets 1 and a length L equal to several times of the length L' of the floating body 2 (in FIG. 13, only sections 1.1 to 1.4 are shown). Further, the electromagnets 1 in each of the sections are controlled and excited by the single-phase AC current for floatation and the three-phase AC currents for movement (backward movement) in each section as a unit.

With the above configuration, description is now made to the case where the floating body 2 moves from the section (block) 1.1 toward the section 1.4 and stops between the sections 1.3 and 1.4.

When the single-phase AC current for floatation and the three-phase AC currents for movement are supplied to the electromagnets 1 of the section 1.1, the floating body 2 is floated and moved. The sections 1.2 and 1.3 are successively and similarly excited, and the floating body 2 moves from the section 1.2 to the section 1.3. When the floating body 2 comes above the section 1.3, the single-phase AC current for floatation and the three-phase AC current for backward movement are supplied to the section 1.4. When the floating body 2 moves toward the section 1.4 and the front portion of the floating body 2 comes above the section 1.4, the floating body 2 is returned toward the section 1.3 by the force of motional inertia of the floating body 2, and the force in the direction reverse to the movement direction by the moving magnetic field $B_4$ and the floating body 2 returned toward the section 1.3 is again returned to the section 1.4 by the force in the movement direction by the moving magnetic field $B_3$. This operation is repeated and the inertial force of movement of the floating body 2 is minimized to zero, so that the floating body 2 is stopped at a predetermined position S in which the center of the floating body is positioned at the boundary of the sections 1.3 and 1.4 as shown in FIGS. 14 and 15 (the stop position means a predetermined range including the length of the floating body). At this time, the force in the movement direction and the force in the direction opposite to the movement direction by the moving magnetic fields $B_3$ and $B_4$, respectively, act on the floating body 2, and these forces become balanced when the floating body stops.

In this manner, the floating body 2 can be stopped at the predetermined stop position S easily with high accuracy.

Figure 16A:
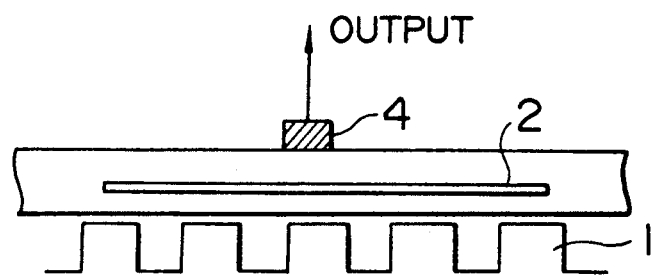
FIG. 16 is a diagram for explaining operation of the embodiment of FIG. 13.
Figure 16B:
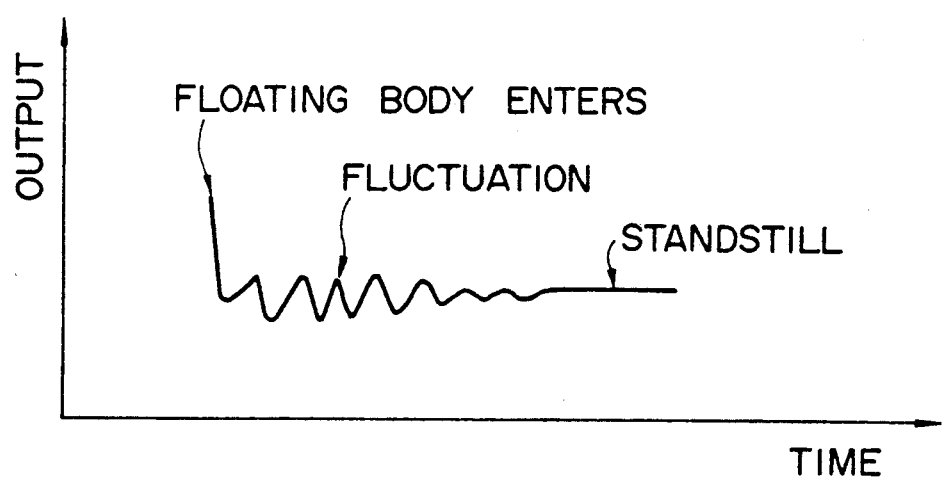

Further, a sensor 4 (optical type, eddy current type or the like) is provided above the stop position of the floating body 2 as shown in FIG. 16(a), the stopping of the floating body 2 is detected by the fact that the variation of the sensor output (FIG. 16(b)) is reduced within a set value.

A sixth embodiment of the present invention is now described with reference to FIG. 17.

In the configuration of the fifth embodiment, the length L' of the floating body 2 can be set as described below.

As shown in FIG. 17, when the floating body 2 is at the stop position S, the magnetic field 8 generated when only the single phase AC current flows through the electromagnets 1 is distributed strongly and weakly along the conveyance direction. Thus, the length L' of the floating body 2 is set so that the front end and the rear end of the floating body 2 are respectively positioned at the weak portions of the magnetic field.

In the configuration of FIG. 13, in the same manner as the fifth embodiment of the present invention, the floating body 2 is moved from the section 1.1 and is stopped at the stop position S between the sections 1.3 and 1.4 as shown in FIG. 17 Thereafter, when the moving magnetic fields $B_3$ and $B_4$ by the three-phase AC currents are minimized to zero, the floating body 2 comes to a standstill stably, so that the front and rear ends of the floating body 2 are positioned at the weak portions of the magnetic field; that is, the body 2 becomes sandwiched between the strong portions of the magnetic field. More particularly, when the floating body 2 is moved toward the section 1.3 or 1.4, the front end or the rear end of the floating body 2 comes above the strong portion of the magnetic field, and accordingly the floating body receives the force reverse to the moving direction so as to be prevented from moving toward the section 1.3 or 1.4.

In this manner, the floating body 2 is held to the stop position with high accuracy.

Further, the three-phase AC currents for the electromagnets 1 may be cut off by the signal from the sensor 4 shown in FIG. 16. Since the moving speed of the floating body 2 is substantially constant, the three-phase AC currents may be cut off after a predetermined time.

While in the embodiments the sections are energized in turn along with the movement of the floating body 2, it is a matter of course that the whole sections may be energized from the beginning.

We claim:

1. An AC magnetic floating apparatus for floating and conveying a conductive floating body of paramagnetic or nonmagnetic metallic material above a line of SC electromagnetics, comprising:

a single-phase AC current source having a first frequency for floating said floating body;

a three-phase AC current source having a second frequency for conveying said floating body;

said first frequency being higher than said second frequency;

means for adding AC currents from said two current sources; and a supply circuit for supplying said added AC currents to said line of AC electromagnets.

2. An apparatus according to claim 1, wherein said floating body is made of aluminum, said first frequency is 50 to 150 Hz, and said second frequency is substantially 50 Hz.

3. An apparatus according to claim 1, wherein said line of electromagnets is divided into sections each having a length longer than a least a length of said floating body and being insulated electrically, and a supply circuit is provided for each section.

4. An apparatus according to claim 3, further comprising a position detection means for detecting a position of said floating body in a conveyance direction above said AC electromagnets, and a means for switching said supply circuit for supplying the added AC currents on the basis of the detected position.

5. An apparatus according to claim 4, wherein said position detection means is disposed at front and rear positions within each of said sections with respect to the movement direction of said floating body, and said switching means energizes an adjacent forward section in the movement direction of said floating body when said floating body is detected and said position detection means disposed at the rear position becomes on, and said switching means turns off power supply to an adjacent backward section in the movement direction of said floating body when said position detection means disposed at the front position becomes on or becomes off from the on state.

6. An apparatus according to claim 4, wherein said position detection means is disposed in each of said sections, and said switching means energizes an adjacent forward section with respect to the movement direction of said floating body, and turns off power supply to an adjacent backward section when said position detection means becomes on, detecting said floating body.

7. An AC magnetic floating conveyance method for floating and conveying a conductive floating body of paramagnetic or nonmagnetic metallic material above a line of AC electromagnets divided into sections each having a length longer than at least a length of said floating body and being insulated electrically from one another, comprising the steps of:

superposing a single-phase AC current for floating said floating body and three-phase AC currents for conveying said floating body to produce a superposed current;

supplying said superposed current to said line of AC electromagnetics for forward motion of said floating body, said superposed current being supplied to a section of said line of AC electromagnets located on a backward side of a desired stop position with respect to the moving direction of said floating body;

supplying said superposed current for moving said floating body in a backward direction reverse to the forward movement direction thereof to a section of said line of AC electromagnets located on a forward side of the desired stop positions; and stopping movement of said floating body.

* * * * *